Feb. 2, 1954  J. F. JAROS  2,667,810
DEVICE FOR ADVANCING FILM STRIPS
Filed Feb. 20, 1951  4 Sheets-Sheet 2
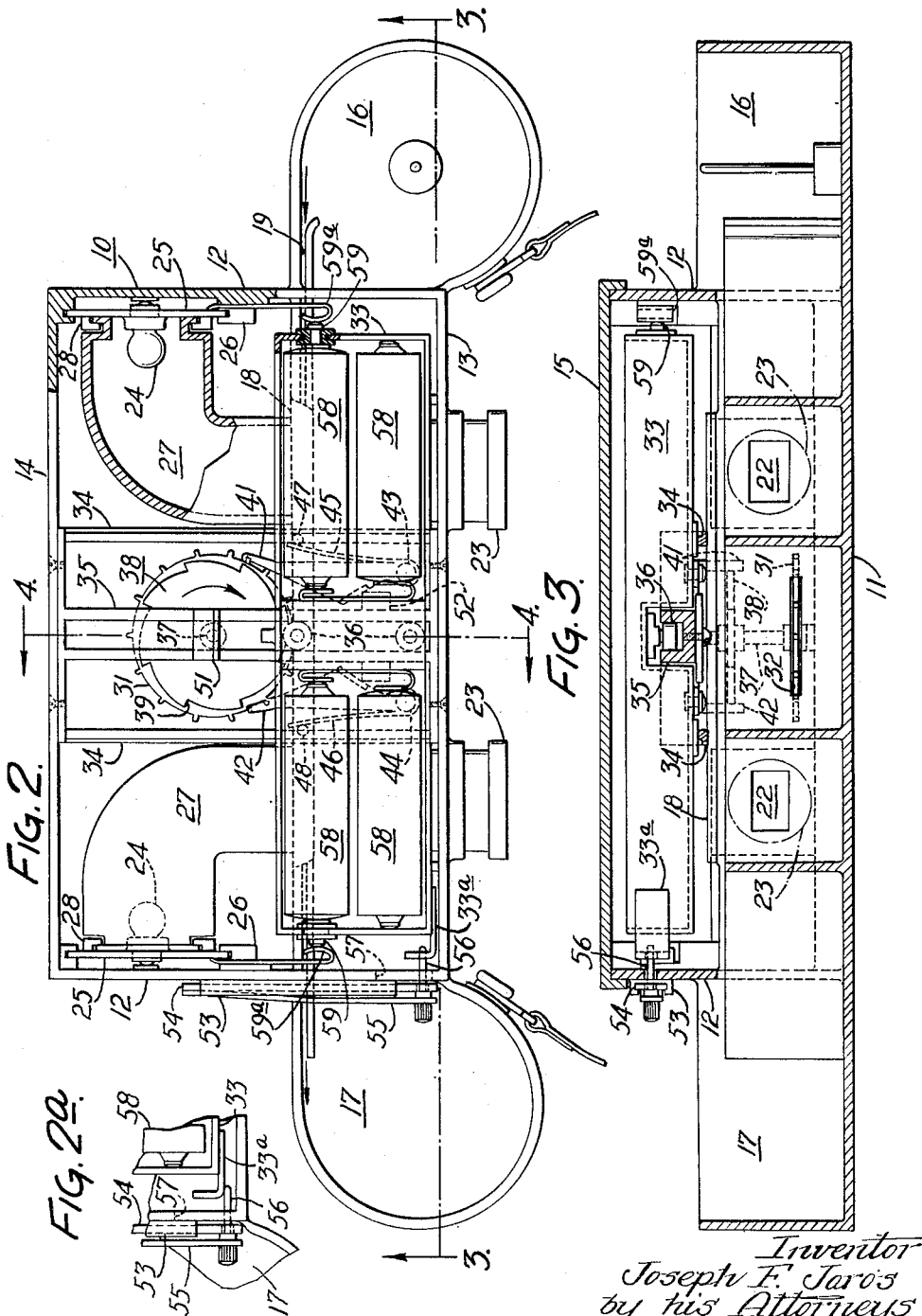
Inventor:
Joseph F. Jaros
by his Attorneys
Howson & Howson Feb. 2, 1954 J. F. JAROS 2,667,810
DEVICE FOR ADVANCING FILM STRIPS
Filed Feb. 20, 1951 4 Sheets-Sheet 3

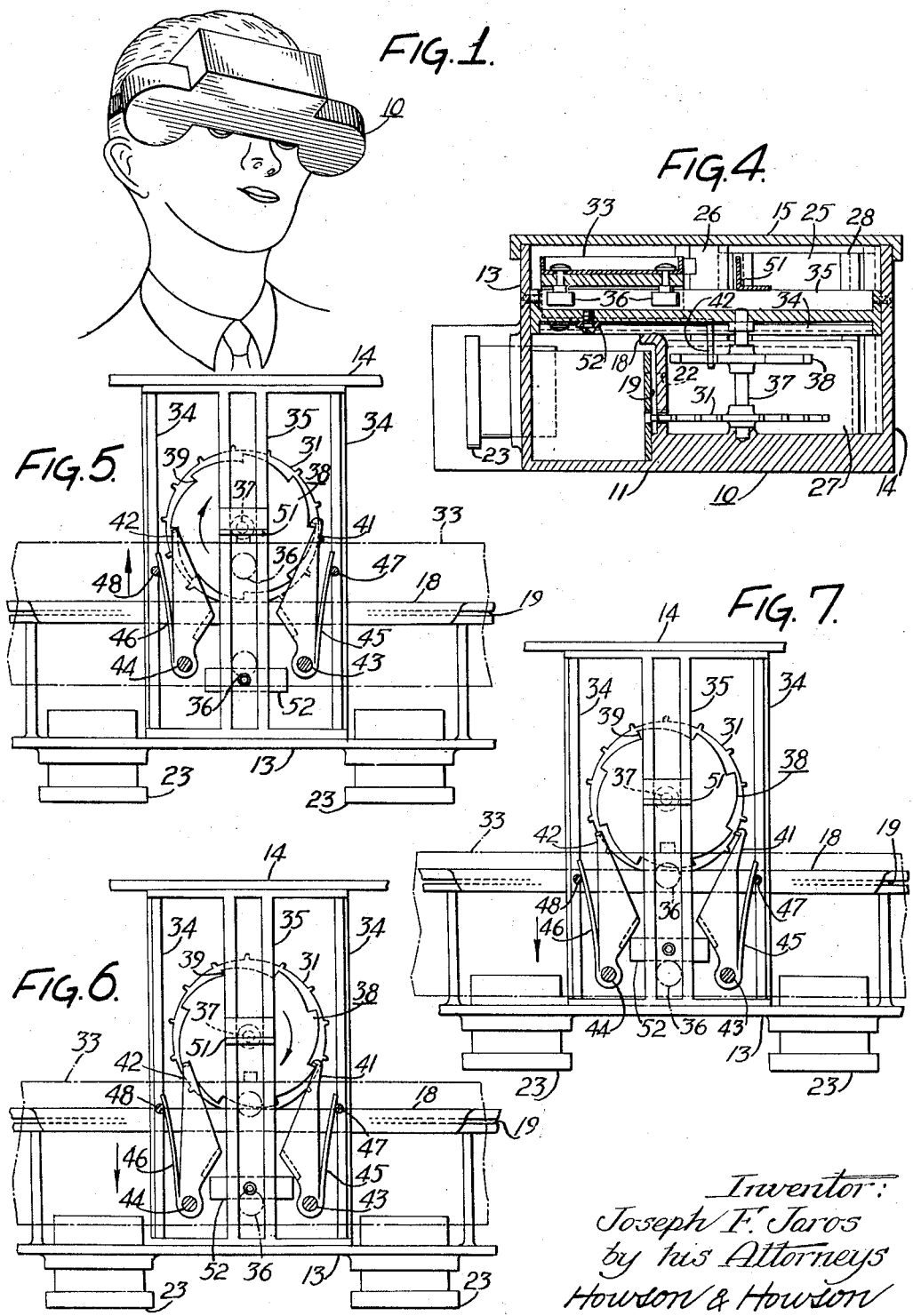

Inventor:
Joseph F. Jaros
by his Attorneys
Howson & Howson

Feb. 2, 1954  J. F. JAROS  2,667,810
DEVICE FOR ADVANCING FILM STRIPS
Filed Feb. 20, 1951  4 Sheets-Sheet 4
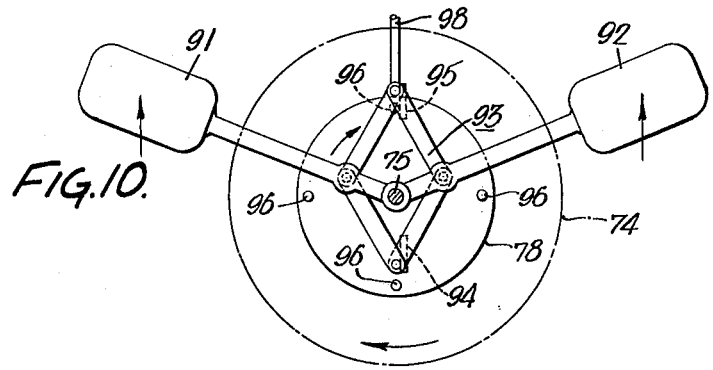
FIG.10.
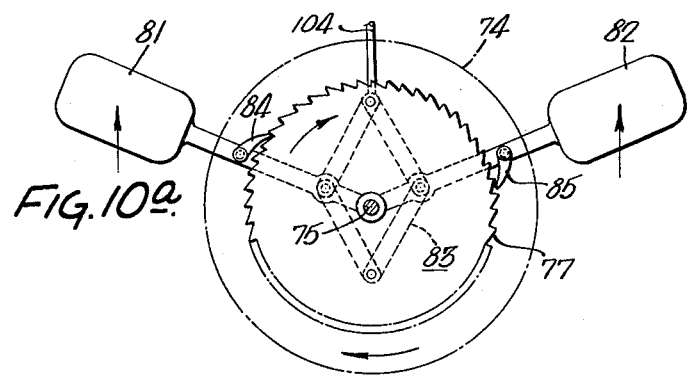
FIG.10ª.
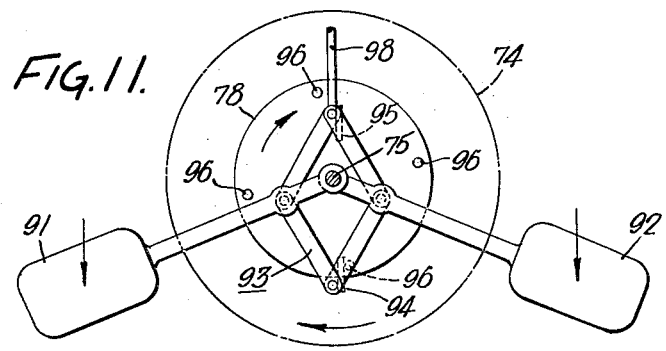
FIG.11.
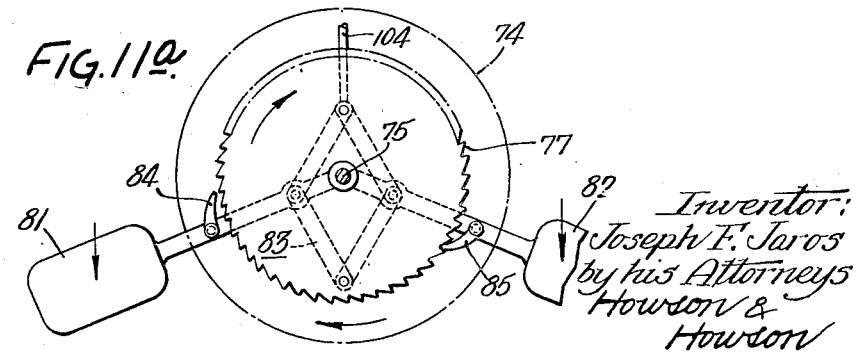
FIG.11ª.
Inventor:
Joseph F. Jaros
by his Attorneys
Howson &
Howson Patented Feb. 2, 1954

2,667,810

UNITED STATES PATENT OFFICE 2,667,810

DEVICE FOR ADVANCING FILM STRIPS

Joseph F. Jaros, Chicago, Ill., assignor of one-half to Harry N. Seversen, Ardmore, Pa.

Application February 20, 1951, Serial No. 211,955

24 Claims. (Cl. 88—31)

The present invention relates to new and useful improvements in film strip advancing mechanism and more particularly, to new and useful improvements in film advancing means especially adapted for stereoscopic viewers, photographic cameras, projectors and like devices, this application being a continuation-in-part of my copending application Serial No. 752,731, filed June 5, 1947, now abandoned.

The present invention is particularly adapted for use in devices in which a film, such as a photographic film, is required to be advanced step-by-step either automatically or manually as desired thereby leaving the open hands free to perform other work.

With the foregoing in mind, a principal object of the present invention is to provide a novel film advancing device which embodies automatic film advancing mechanism operable to cause a film to be advanced without the use of the wearer's hands.

Another object of the present invention is to provide a novel automatic film advancing mechanism which is actuable solely by a predetermined tilting movement of the device.

A still further object of the present invention is to provide a novel device of the type described, having the features and characteristics set forth, which is of comparatively simplified construction and entirely efficient and effective in operation and use.

These and other objects of the present invention and the various features and details of the operation and construction thereof are hereinafter fully set forth and described with reference to the accompanying drawings, in which:

Fig. 1 is a perspective view illustrating the present invention in the embodiment of a stereoscopic viewer which is adapted to be worn on the head of the user.

Fig. 2 is a plan view partially in section of the stereoscopic viewer with the cover removed;

Fig. 2a is a fragmentary plan view illustrating the forward limit position of the carriage during automatic operation thereof;

Fig. 3 is a transverse sectional view taken on line 3—3, Fig. 2;

Fig. 4 is a longitudinal sectional view taken on line 4—4, Fig. 2;

Figs. 5, 6 and 7 are fragmentary plan views of the stereoscopic viewer with the carriage removed, illustrating the operation of the film advancing mechanism;

Figure 8:
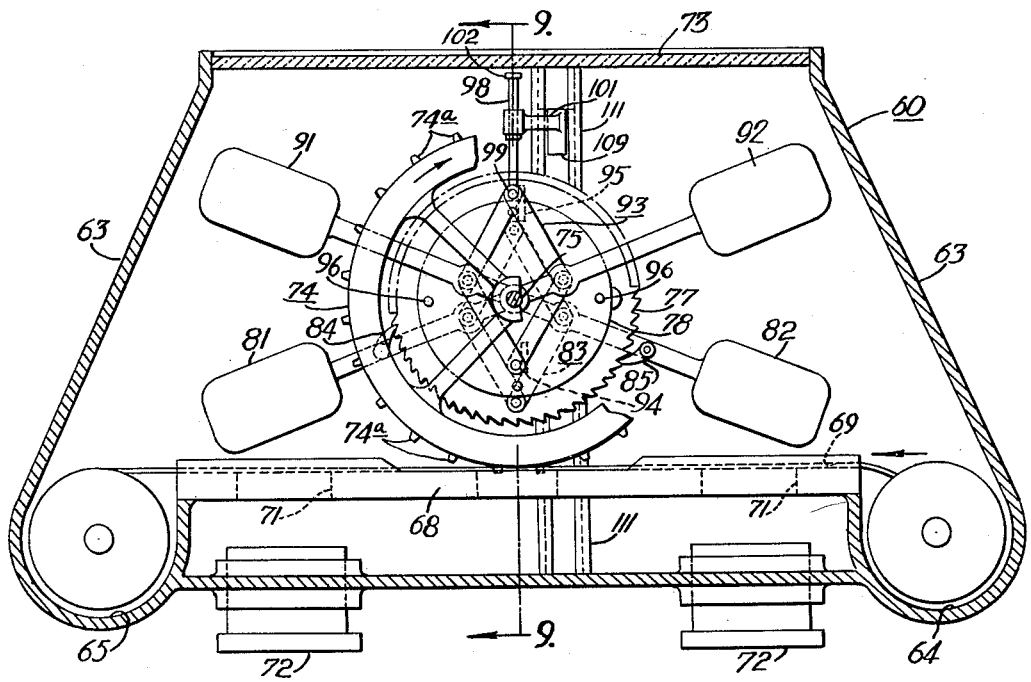
Fig. 8 is a plan view of a modified form of stereoscopic viewer made in accordance with the present invention.

Figs. 10 and 10a are fragmentary schematic plan views of the escapement means and motor means, respectively, in the position they asuume when the housing is tilted in one direction; and Figs. 11 and 11a are fragmentary schematic plan views similar to Figs. 10 and 10a illustrating the operating positions with the housing tilted in the other direction.

With reference to the drawings, the invention is illustrated in conjunction with a stereoscopic viewer device which is adapted to be worn on the head of the user, and referring particularly to Figs. 1 to 4 thereof, reference numeral 10 designates generally a housing for the stereoscopic viewer and comprises a base portion 11, side walls 12, and front and rear walls 13 and 14, respectively. A cover 15 is provided to fit over the open upper surface of the housing 10. Formed as integral parts of the opposite side walls 12 are a film supply compartment 16 and a film receiving compartment 17 adapted to support the film passed through the viewer.

Extending transversely of the viewer is a film directing member 18 which has a slot 19 therein adapted to receive and guide the film. A pair of film apertures 22 are provided in the film directing member 18 equally spaced at opposite sides of the longitudinal axis of the stereoscopic viewer and these apertures are positioned to receive mating pairs of pictures. Positioned in axial alignment with the film apertures 22 and adjustably mounted in the forward wall 13 of the housing 10 is a pair of lenses 23 which magnify and bring into proper focus the pictures framed in the film apertures 22.

In the present embodiment of the invention the film is illuminated by means of a pair of lamps 24 mounted on generally rectangular bases 25 carried by slides 26 which are formed as integral parts of the side walls 12. By mounting the lamps 24 in this manner they are easily accessible when it is necessary to change or replace them. Light is directed from the lamps 24 to the film apertures 22 by shields 27 formed as illustrated in Fig. 2 and having their interior coated or painted with a material which will transmit perfectly white light to the film apertures 22. The shields 27 are carried by slides 28 formed as an integral part of the base 25 to allow the shields 27 to be easily removed from the base 25.

In accordance with the present invention the film is advanced by means of a sprocket wheel 31 rotatably mounted in the housing 10 with a portion of its periphery extending through a slot 32 in the film directing member 18 so that the teeth on the sprocket 31 engage the usual openings provided in the film. An importnt feature of the present invention is the provision of mechanism to rotate the sprocket 31 and thereby advance the film when desired. To this end a carriage 33 is provided which is slidably mounted on a pair of spaced parallel tracks 34 extending transversely of the housing. The carriage 33 is freely mounted on the tracks 34 and may be moved therealong merely by tilting the housing forward or backward.

Relative twisting movement of the carriage 33 is prevented by means of a guide 35 extending transversely of the housing 10 and adapted to engage a pair of rollers 36 depending downwardly from the lower surface of the carriage 33. Thus when the housing 10 is tilted rearwardly the carriage 33 will move toward the rear of the stereoscopic viewer, and when the housing is tilted forwardly the carriage 33 will readily move toward the front of the viewer.

As previously described, the film is advanced by means of the sprocket wheel 31 rotatably mounted in the housing 10. The sprocket wheel 31 is fixedly secured to the lower end of a vertical shaft 37, and the upper end of the shaft 37 carries a ratchet wheel 38 which has a plurality of ratchet teeth 39 thereon. The teeth 39 of the ratchet wheel 38 are adapted to be engaged by a pair of pawls 41 and 42 which actuate the ratchet wheel 38 and in turn the sprocket wheel 31 during the forward and rearward movement of the carriage 33. The pawls 41 and 42 are pivotally mounted to the lower surface of the carriage 33 as indicated at 43 and 44, respectively, and are normally urged into engagement with the teeth 39 on the ratchet wheel 38 by means of springs 45 and 46 formed as integral parts of the pawls 41 and 42. The springs 45 and 46 bear against and react on lugs 47 and 48 which depend downwardly from the lower surface of the carriage 33 and thus urge the pawls 41 and 42 normally into engagement with the ratchet wheel 38.

With reference to Figs. 5, 6 and 7 of the drawings, the pawls 41 and 42 are constructed so that during the forward stroke of the carriage 33 the pawl 41 will engage the teeth of the ratchet wheel 38 and rotate the same and the sprocket 31 in the clockwise direction. At the same time the pawl 42 ratchets over the teeth of the ratchet wheel 38 so that during the rearward stroke of the carriage 33 the pawl 42 engages the teeth of the ratchet wheel 38 to rotate the same further in the clockwise direction while the pawl 41 ratchets over the teeth of the ratchet wheel. Extending upwardly from the guide 35 is a stop 51 disposed to engage the rear surface of the carriage 33 and thus limit the extreme rearward position of the carriage. A cam member 52 secured to the lower surface of the guide 35 operates to disengage the pawls 41 and 42 from the ratchet wheel when the carriage 33 is in its extreme forward position, as shown in Figs. 2 and 7.

However, it is important in the automatic operation of the device by back and forth tilting movement thereof that forward movement of the carriage 33 be terminated sufficiently short of its extreme forward position to prevent disengagement of the pawls 41 and 42 from the ratchet wheel 38, and in the present instance an auxiliary stop for the carriage 33 short of its extreme forward position is provided as a part of mechanism which is provided to effect manual back and forth actuation of the carriage 33 as distinguished from automatic actuation thereof by back and forth tilting movement of the device.

To this end a slide 53 is secured to one side of the housing 10 and carries a reciprocable member 54 therein. The member 54 in turn has a resilient spring 55 secured thereto which supports a finger 56 extending inwardly through a slot 57 into the housing 10. The finger 56 is adapted to releasably engage through an opening in an extension 33a endwise outwardly from the carriage 33. Thus manual movement of the member 54 on its slide 53 will impart similar motion to the carriage 33, thereby advancing the film through the stereoscopic viewer in the manner described. With the finger 56 engaged in the opening in the carriage extension 33a for manual operation as described, manual reciprocation of the member 54 on its slide 53 operates to move the carriage 33 to and from its extreme forward position in which the pawls 41 and 42 are disengaged from the ratchet wheel 38 by cam 52 and consequently the finger 56 may be engaged through the opening in the extension 33a to retain the carriage 33 in its extreme forward position, disengaged from the pawls 41 and 42, so as to permit rewinding of the film strip without interference from the film advancing mechanism.

As previously stated, finger 56 is releasable from the carriage extension 33a and, in the case of automatic operation of the carriage by back and forth tilting movement of the device, the finger 56 preferably is disengaged from the carriage extension 33a and the device tilted to move the carriage toward its rearward position. After the carriage extension has cleared the finger 56 the latter is moved to the forward limit of the slot 57 and then released so that its spring 55 positions it inwardly of the device in the path of forward movement of the carriage 33 as shown in Fig. 2a of the drawings. Thus the finger 56 constitutes an auxiliary stop which acts to terminate forward movement of the carriage 33 sufficiently short of its extreme limit position to prevent the cam 52 from disengaging the pawls 41 and 42 from the ratchet wheel 38.

With the finger 56 positioned as described and functioning as an auxiliary stop for the carriage 33, it is pointed out that back and forth tilting movement of the device will cause the carriage 33 similarly to move back and forth a fixed distance which is predetermined to cause the sprocket 31 to be rotated step-by-step and actuate or advance the film strip the required distance during each complete back and forth stroke of the carriage.

It is important that the forward and rearward limit positions assumed by the carriage 33 during tilting of the housing 10 are such that the carriage moves back and forth a fixed distance which is predetermined to cause the sprocket 31 to be rotated step-by-step and actuate or advance the film strip the required distance during each complete back and forth stroke of the carriage. In other words, when the carriage is actuated to the rear of the housing 10 and the pawl 41 operates to actuate the sprocket 31 a distance to advance the film strip one-half the required distance, and when the carriage is actuated to the front of the housing the pawl 42 operates to rotate sprocket 31 a further increment to advance the film strip the final one-half of the required distance so that successive full picture advancements of the film strip are effected by successive complete strokes, back and forth, of the carriage 33.

When the carriage 33 is in the forward limit position illustrated in Fig. 2a, a pair of pictures are presented to the film apertures 22 and the lamps 24 are lit, thereby illuminating the film. A plurality of batteries 58 are carried by the carriage 33 and are adapted to light the lamps 24 when the carriage is in its forward position. To this end a pair of contacts 59 extend outwardly from each side of the carriage 33 and are operable to engage contact members 59a which completes the circuit to the lamps 24. In order to prevent the lamps from being lit when the stereoscopic viewer is not in use the carriage 33 may be moved toward the rear of the housing and the finger 56 disengaged from the extension 33a and placed in front of the extension 33a to prevent engagement of the contact members 59 and 59a.

Figure 9:
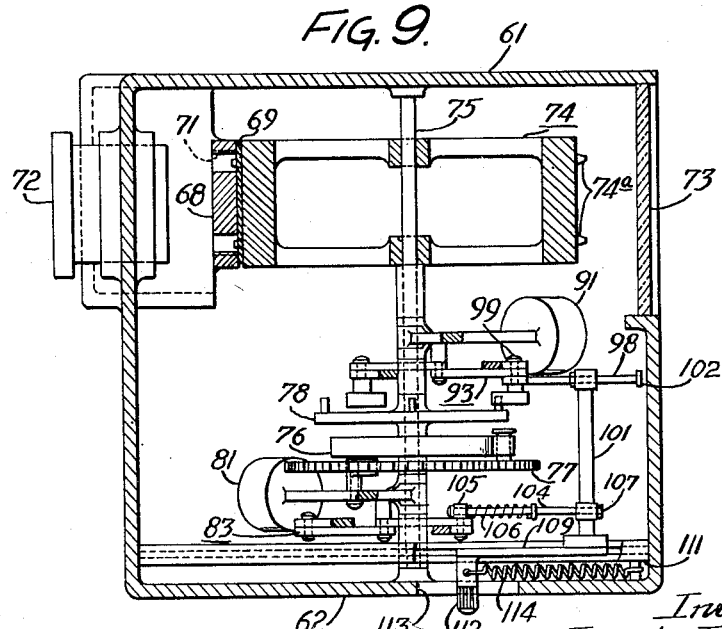
Fig. 9 is a longitudinal sectional view taken on line 9—9, Fig. 8.

A modified form of the present invention is illustrated in Figs. 8 and 9. The film actuating mechanism of this embodiment is shown in conjunction with a stereoscopic viewer which comprises a housing or case designated generally as 60 and includes top and bottom walls 61 and 62, respectively, and diagonal side walls 63. The side walls 63 are extended at the front end of the housing and curved to provide a film supply compartment 64 and a film receiving compartment 65.

Extending transversely of the housing 60 from the film supply compartment 64 to the film receiving compartment 65 is a film directing member 68 which has a slot 69 therein through which the film passes. A pair of film apertures 71 are provided in the film directing member 68 equally spaced at opposite sides of the transverse axis of the stereoscopic viewer and these apertures are positioned to receive mating pairs of pictures. Adjustably mounted in the forward wall of the housing 60 in axial alignment with the film apertures 71 are a pair of lenses 72 which magnify and bring into proper focus the pictures framed in the film apertures 71. In the present embodiment of the invention the film is illuminated by admitting light to the interior of the housing 60 through a translucent window 73 which is provided at the rear of the housing 60.

In accordance with the present invention the film is advanced by means of a sprocket wheel 74 rotatably mounted in the housing 60 and having a plurality of pins 74a thereon which are adapted to engage openings in the film. In the present embodiment separate means are provided to actuate the sprocket wheel 74 and to control the amount of rotation thereof.

Operation of the sprocket wheel 74 is effected by tilting the housing 60 backward and forward. Each time the rear of the housing is lowered and raised a separate set of pictures is presented to the film apertures 71. The sprocket wheel 74 is fixedly secured to a vertical shaft 75 which is rotatably mounted in the top and bottom walls 61 and 62 respectively of the housing. The shaft 75 is driven by means of a coil spring 76 which encircles the shaft 75 and has its inner end fixedly secured thereto. The outer end of the coil spring 76 is fastened to a ratchet wheel 77. An escapement disc 78 is also secured to the shaft 75 to limit the amount of rotation thereof during each complete tilting motion of the housing 60. With reference to Figs. 10a and 11a, a pair of weighted arms 81 and 82 are rotatably mounted on the shaft 75 and are operable to wind the coil spring 76 during each cycle of operation of the stereoscopic viewer. The weighted arms 81 and 82 are interconnected by a linkage designated generally as 83 in order to provide similar motion to each of the arms. Pawls 84 and 85 extend inwardly of the arms 81 and 82 respectively and are held in engagement with the teeth of the ratchet wheel 77.

As shown in Fig. 10a when the housing 60 is tilted rearwardly the pawl 84 operatively engages the teeth of the ratchet wheel 77 and rotates the same in a clockwise direction. Similarly, as illustrated in Fig. 11a, when the housing 60 is tilted forwardly the weighted arms 81 and 82 move toward the front of the housing and the pawl 84 operatively engages the ratchet wheel 77, thereby rotating it further in a clockwise direction. Clockwise direction of the ratchet wheel 77 operates to wind the spring 76. It is readily apparent that by this construction a substantially constant tension is maintained in the spring 76 due to the fact that the spring resists movement of the arms 81 and 82. It is also apparent that the spring 76 may be omitted and the ratchet wheel 77 fixedly secured to the shaft 75 in order to impart rotation thereto.

As previously mentioned, the amount of rotation of the sprocket wheel 74 is limited by means of the escapement discs 78. With reference now to Figs. 10 and 11, a pair of weighted arms 91 and 92 are rotatably mounted on the shaft 75 and are interconnected by a linkage 93 in order to assure similar movement of each of the arms 91 and 92. Depending downwardly from the forward and rear ends of the linkage 93 is a pair of blades 94 and 95, respectively, which are adapted to engage lugs 96 extending upwardly from the escapement discs 78.

As illustrated in Fig. 10, when the housing 60 is tilted rearwardly the arms 91 and 92 move toward the rear of the housing, thereby placing the blade 95 in the path of the lugs 96 thus effectively stopping rotation of the shaft 75 and also the sprocket wheel 74. As the housing 60 is tilted forwardly the arms 91 and 92 move to a position as indicated in Fig. 11, thus removing the blade 95 from engagement with the lug 96 and allowing the escapement disc 78 to rotate until a second plug 96 is brought into engagement with the forward blade 94. The lugs 96 are so positioned on the escapement discs 78 that a complete rearward and forward tilting cycle of the housing 60 will permit the sprocket wheel 74 to rotate the exact amount necessary in order to present the next set of pictures to the film apertures 71.

The driving mechanism and the escapement means of the present embodiment may be actuated by a method which does not require tilting of the housing. To this end the linkage 93 associated with the escapement means is provided with a reciprocating rod 98 connected with the linkage at the pivot 99. The reciprocating rod 98 passes through an upright standard 101 and the rod is provided with stops 102 located on opposite sides of the standard. In a similar manner the linkage 83 associated with the ratchet wheel 77 is also provided with a reciprocating rod 104 secured to the linkage 83 as indicated at 105. The connection between the reciprocating rod 104 and the linkage 83 is constructed to provide a lost motion connection with the thrust being taken up by a coil spring 106, thereby preventing exertion of too great a tension on the spring 76. The reciprocating rod 104 also passes freely through the standard 101 and has stops 107 disposed at opposite sides of the standard.

The standard 101 is formed integrally with a reciprocable member 109 mounted for limited longitudinal movement on slides 111. The reciprocable member 109 may be reciprocated by a lug 112 which extends outwardly through a slot 113 in the housing of the stereoscopic viewer. By forcing the reciprocable member 109 forward and backward the escapement means and the ratchet wheel are operated thereby moving the film through the stereoscopic viewer. A coil spring 114 is provided to yieldably bias the reciprocable member 109 and thus the upright 101 in a neutral position.

From the foregoing it will be observed that the present invention provides novel film advancement mechanism whereby film may be advanced stey-by-step either automatically or manually as desired. Furthermore, the present invention provides film advancing means which may be actuated by a predetermined movement of the operator's head or a tilting movement of the device thereby leaving the operator's hands free to perform other work.

While the invention has been illustrated and described with reference to a stereoscopic viewer device it will be apparent that the film advancing mechanism made in accordance with the present invention is equally adaptable for use in photographic cameras and projectors, other types of viewers, viewer projectors and other devices in which a film strip is advanced step-by-step through a succession of steps of equal increments. Furthermore, the particular embodiment of the mechanism of the present invention shown and described herein may be changed and modified within the scope of the following claims.

I claim:

1. In a device for advancing a film strip, means to engage and advance the film strip, weighted means mounted in said device for free back and forth movement and actuatable in said directions respectively by back and forth tilting motion of the device, drive mechanism for said film advancing means, pawls carried by said weighted means operable during each back and forth movement thereof to effect actuation of said drive mechanism one step for each unidirectional movement of the weighted means, and stop means operable to predeterminedly limit movement of the drive mechanism in each direction and thereby cause the advancing means to advance the film strip in successive equal steps.

2. In a device for advancing a film strip, means to engage and advance the film strip, weighted means mounted in said device for free movement back and forth in directions forwardly and rearwardly of the device and actuatable in said directions respectively by backward and forward tilting motion of the device, drive mechanism for said film advancing means, pawls carried by said weighted means operable during each back and forth movement of the weighted means to effect actuation of said drive mechanism one step for each unidirectional movement of the weighted means, and stop means operable to predeterminedly limit movement of the drive mechanism in each direction and thereby cause the advancing means to advance the film strip in successive equal steps.

3. In a device for advancing a film strip, means to engage and advance the film strip, weighted means mounted in said device for free back and forth movement within predetermined limits, drive mechanism for said film advancing means, pawls carried by said weighted means operable during each back and forth movement thereof to actuate the drive mechanism one step for each unidirectional movement of the weighted means, and manual means actuatable into engagement with said weighted means and selectively operable at will to actuate said weighted means back and forth.

4. In a device for advancing a film strip, means comprising a rotatable sprocket having teeth to engage and advance the film strip, weighted means mounted in said device for free movement back and forth in directions forwardly and rearwardly of the device and actuatable in said directions respectively by backward and forward tilting motion of the device, drive mechanism for said film advancing means including a rotatable ratchet wheel, pawls carried by said weighted means operable during each back and forth movement of the weighted means to engage said ratchet and effect actuation of said drive mechanism one step for each unidirectional movement of the weighted means, and stop means operable to predeterminedly limit movement of the drive mechanism in each direction and thereby cause the advancing means to advance the film strip in successive equal steps.

5. In a device for advancing a film strip, means comprising a member having teeth to engage and advance the film strip, weighted means mounted in said device for free back and forth movement and actuatable in said directions respectively by back and forth tilting motion of the device, a shaft rotatably mounted in said device and mounting said film advancing member, drive mechanism for said film advancing member including a ratchet wheel mounted on said shaft, and pawls carried by said weighted means operable by back and forth movement of the weighted means to engage and rotate said ratchet wheel step-by-step in the same direction.

6. In a device for advancing a film strip, means comprising a member having teeth to engage and advance the film strip, weighted means mounted in said device for free movement in respectively opposite directions forwardly and rearwardly of the device and actuatable in said directions respectively by backward and forward tilting motion of the device, a shaft rotatably mounted in said device and mounting said film advancing member, drive mechanism for said film advancing means including a ratchet wheel mounted on said shaft, pawls carried by said weighted means operable during each backward and forward tilting motion of the device to engage and rotate said ratchet wheel one step for each unidirectional movement of the weighted means, and stop means operable to predeterminedly limit movement of the drive mechanism in each direction and cause the film advancing member to advance the film strip in successive equal steps.

7. In a device for advancing a film strip, means to engage and advance the film strip, weighted means mounted in said device for back and forth movement and actuatable in said directions respectively by back and forth tilting motion of the device, drive mechanism for said film advancing means, pawls carried by said weighted means operable during each back and forth movement of the weighted means to effect actuation of said drive mechanism one step for each unidirectional movement of the weighted means, stop means operable to predeterminedly limit movement of the drive mechanism in each direction and thereby cause the advancing means to advance the film strip in successive equal steps, and manual means engageable with said weighted means and selectively operable to actuate said weighted means.

8. In a device for advancing a film strip, means to engage and advance the film strip, a weighted carriage slidably mounted in said device for free movement back and forth in directions forwardly and rearwardly of the device and actuatable in said directions respectively by backward and forward tilting movement of the device, drive mechanism for said film advancing means, pawls carried by said carriage operable during each back and forth movement of the carriage to effect actuation of said drive mechanism one step for each unidirectional movement of the carriage, and stop means operable to predeterminedly limit movement of the drive mechanism in each direction and thereby cause the advancing means to advance the film strip in successive equal steps.

9. In a device for advancing a film strip, a rotatable sprocket having teeth to engage and advance the film strip, a weighted carriage slidably mounted in said device for free back and forth movement and actuatable in said directions respectively by back and forth tilting motion of the device, drive mechanism for said sprocket including a ratchet wheel, pawls carried by said carriage and engaging opposite sides of said ratchet wheel operable during each back and forth movement of the carriage to engage and rotate said ratchet wheel and effect actuation of said sprocket one step for each unidirectional movement of the carriage, and stop means operable to predeterminedly limit actuation of the ratchet wheel in each direction of the carriage and thereby cause the sprocket to advance the film strip in successive equal steps.

10. In a device for advancing a film strip, means to engage and advance the film strip, a weighted carriage slidably mounted in said device for free back and forth movement in directions forwardly and rearwardly of the device and actuatable in said directions respectively by backward and forward tilting movement of the device, drive mechanism for said film advancing means, pawls carried by said carriage operable during each back and forth movement of the carriage to effect actuation of said drive mechanism one step for each unidirectional movement of the carriage, stop means operable to predeterminedly limit movement of the drive mechanism in each direction and thereby cause the advancing means to advance the film strip in successive equal steps, an electric circuit including a source of electrical energy, lamps to illuminate said film and switch means normally biased to open circuit position, and means on said carriage operable in one limit position thereof to engage and close said switch means.

11. In a device for advancing a film strip, a rotatable sprocket having teeth to engage and advance the film strip, a weighted carriage slidably mounted in said device for free back and forth movement and actuatable in said directions respectively by back and forth tilting motion of the device, drive mechanism for said sprocket including a ratchet wheel, pawls carried by said carriage and engaging opposite sides of said ratchet wheel operable during each back and forth movement of the carriage to engage and rotate said ratchet wheel and effect actuation of said sprocket one step for each unidirectional movement of the carriage, an electric circuit including a source of electrical energy, lamps to illuminate said film and switch means normally biased to open circuit position, and means on said carriage operable in one limit position thereof to engage and close said switch means.

12. In a device for advancing a film strip, a rotatable sprocket having teeth to engage and advance the film strip, a weighted carriage slidably mounted in said device for free back and forth movement and actuatable in said directions respectively by back and forth tilting motion of the device, a shaft rotatably mounted in said device and mounting said sprocket wheel, drive mechanism for said sprocket including a ratchet wheel mounted on said shaft, pawls carried by said carriage and engaging opposite sides of said ratchet wheel operable during each back and forth movement of the carriage to engage and rotate said ratchet wheel and effect rotation of said sprocket one step for each unidirectional movement of the carriage, and stop means operable to predeterminedly limit actuation of the ratchet wheel in each direction of the carriage and thereby cause the sprocket to advance the film strip in successive equal steps.

13. In a device for advancing a film strip, guide means for the film, motor means including a shaft capable of operation in one direction only for advancing the film strip through said guide means, weighted means mounted at opposite sides of the shaft for free movement back and forth in directions forwardly and rearwardly of the device and actuatable in said directions by backward and forward tilting motion of the device, linkage operatively connecting the weighted means, a member for controlling movement of the linkage to cause the weighted means to move in unison and to a like extent, a ratchet wheel mounted for rotation on the shaft, and a pawl carried by each of the weighted means and engaging the ratchet wheel, one pawl being operative to rotate the ratchet wheel upon movement of the weighted means in one direction and the other pawl being operative to continue rotation of the ratchet wheel upon movement of the weighted means in the opposite direction.

14. In a device for advancing a film strip as claimed in claim 13 which additionally includes a film engaging sprocket rotated by the motor means, and an escapement means interposed between the sprocket and the motor means for controlling the extent of rotation of the sprocket for each actuation of the escapement means.

15. In a device for advancing a film strip as claimed in claim 13 which additionally includes a film engaging sprocket rotated by the shaft, a coil spring having one end fixed to the shaft and fixed at its other end to the ratchet wheel, whereby rotation of the wheel will wind the spring to store energy in the spring, and escapement means for controlling the extent of rotation of the shaft for each actuation of the escapement means.

16. In a device for advancing a film strip, a film guiding and directing member, motor means capable of operation in one direction only for propelling the film through the guiding member, said motor means including a shaft journalled in the device, weighted means mounted for back and forth rotation on the shaft and disposed on opposite sides of the shaft, means operatively connecting the weighted means whereby they move in unison, a ratchet wheel mounted on the shaft, and a pawl carried by each weighted means and engaging the ratchet wheel, one pawl being operative to rotate the ratchet wheel upon movement of the weighted means in one direction and the other pawl being operative to rotate the ratchet wheel upon movement of the weighted means in the opposite direction, said weighted means having movement in a substantially horizontal plane so that they may be actuated by rocking motion of the device, whereby the motor means is operative to propel the film when the device is upright for use as a camera and is also operative to propel the film when the device is inverted for use as a viewer.

17. In a device for advancing a film strip as claimed in claim 16 which additionally includes a sprocket engaging the film and rotated by the motor means and escapement means interposed between the sprocket and motor means for controlling the extent of rotation of the sprocket for each actuation of the escapement means, said escapement means including weighted means mounted for free movement on the shaft, and stop members carried by the weighted means.

18. In a device for advancing a film strip as claimed in claim 16 which additionally includes a sprocket engaging the film and rotated by the shaft, a coil spring having one end fixed to the shaft and fixed at its other end to the ratchet wheel, whereby rotation of the wheel will wind the spring to store energy in the spring for rotating the shaft, and escapement means for controlling the extent of rotation of the shaft for each actuation of the escapement means, said escapement means including weighted means mounted for free movement on the shaft and stop members carried by the weighted means.

19. In a device for advancing a film strip, means to engage and advance the film strip, a weighted carriage slidably mounted in said device for free movement back and forth in directions forwardly and rearwardly of the device and actuatable in said directions respectively by backward and forward tilting movement of the device, a guide to direct movement of said carriage, rollers rotatably mounted on said carriage in engagement with said guide to prevent relative twisting movement of the carriage, drive mechanism for said film advancing means, pawls carried by said carriage operable during each back and forth movement of the carriage to effect actuation of said drive mechanism one step for each unidirectional movement of the carriage, and stop means operable to predeterminedly limit movement of the drive mechanism in each direction and thereby cause the advancing means to advance the film strip in successive equal steps.

20. In a device for advancing a film strip, means to engage and advance the film strip, weighted means mounted in said device for free back and forth movement within predetermined limits, drive mechanism for said film advancing means, pawls carried by said weighted means operable during each back and forth movement thereof to actuate the drive mechanism one step for each unidirectional movement of the weighted means, means operable in one extreme limit position of the carriage to disengage said pawls from the drive mechanism for rewinding of the film strip.

21. In a device for advancing a film strip, means to engage and advance the film strip, weighted means mounted in said device for free back and forth movement within predetermined limits, drive mechanism for said film advancing means, pawls carried by said weighted means operable during each back and forth movement thereof to actuate the drive mechanism one step for each unidirectional movement of the weighted means, means operable in one extreme limit position of the carriage to disengage said pawls from the drive mechanism for rewinding of the film strip, and means to retain the carriage in said extreme limit position during rewinding of the film strip.

22. In a device for advancing a film strip, means to engage and advance the film strip, weighted means mounted in said device for free back and forth movement centrally balanced between opposite lateral sides of the device and actuatable in back and forth directions respectively by back and forth tilting motion of said device, guide means for said weighted means, rollers positioned between said guide means and said weighted means to permit free relative movement therebetween, drive mechanism for said film advancing means, and means interconnecting said weighted means and the drive mechanism during each back and forth movement of the weighted means operable to actuate said drive mechanism one step for each unidirectional movement of the weighted means and thereby cause said advancing means to advance the film strip in successive equal steps.

23. In a device for advancing a film strip, film propulsion means mounted in said device for free to and fro movement, guide means in said device to prevent relative twisting movement of said propulsion means, drive mechanism to engage and advance the film strip, manual means actuatable into engagement with said propulsion means to selectively actuate the same, and stop means operable to predeterminedly limit the to and fro movement of said propulsion means and thereby limit the drive mechanism to successive unidirectional equal steps of film advancement.

24. In a device for advancing a film strip comprising a housing having relatively spaced compartments and means to guide a film strip within the housing from one compartment to the other compartment, film strip advancing means positioned to engage the film strip at a point along the travel thereof from said one compartment to said other compartment and operable to positively advance the film strip in one direction, drive means for said film advancing means, propulsion means actuatable in back and forth directions respectively and operable during each back and forth movement thereof to engage and actuate said drive means and advance the film strip in one direction step-by-step, and stop means to predeterminedly limit back and forth movement of said propulsion means and thereby cause the film advancing means to advance the film strip in successive equal steps.

JOSEPH F. JAROS.

References Cited in the file of this patent

UNITED STATES PATENTS

| Number | Name | Date |
|---|---|---|
| 988,275 | McClave | Mar. 28, 1911 |
| 1,332,870 | Gill | Mar. 2, 1920 |
| 1,808,691 | Stringer | June 2, 1931 |
| 2,003,480 | De Vry | June 4, 1935 |
| 2,305,666 | Bolsey | Dec. 22, 1942 |
| 2,326,718 | Mast | Aug. 10, 1943 |
| 2,387,758 | Jaros | Oct. 30, 1945 |

FOREIGN PATENTS

| Number | Country | Date |
|---|---|---|
| 402,619 | France | Sept. 2, 1909 |